United States Patent [19]

Mascia et al.

[11] Patent Number: 5,300,587
[45] Date of Patent: Apr. 5, 1994

[54] OIL REPELLENT POLYMERIC COMPOSITION AND USE THEREOF, FOR PREPARING FORMED ARTICLES HAVING SURFACES ENDOWED WITH A HIGH STABILITY FORMED ARTICLES HAVING SURFACES ENDOWED WITH A HIGH STABILITY TO SOLVENTS AND A HIGH RESISTANCE TO SOILING

[75] Inventors: Francesco Mascia, Como; Lucio Pinetti; Corrado Brichta, both of Milan, all of Italy

[73] Assignee: Centro Sviluppo Settori Impiego S.r.l., Milan, Italy

[21] Appl. No.: 781,995

[22] Filed: Oct. 18, 1991

[30] Foreign Application Priority Data

Oct. 24, 1990 [IT] Italy ................. 21865 A/90

[51] Int. Cl.$^5$ ..................................... C08F 8/18
[52] U.S. Cl. .......................... 525/359.3; 525/329.2; 525/330.3; 525/331.7; 525/332.1; 525/333.3; 525/342; 525/385; 525/387; 525/942
[58] Field of Search ............... 525/359.3, 387, 385

[56] References Cited

U.S. PATENT DOCUMENTS

| | | | |
|---|---|---|---|
| 3,699,145 | 10/1972 | Sianesi et al. | 558/283 |
| 4,563,394 | 1/1986 | Ishikawa | 428/422 |
| 4,977,222 | 12/1990 | Bargigia | 525/359.3 |

FOREIGN PATENT DOCUMENTS

| | | |
|---|---|---|
| 148482 | 7/1985 | European Pat. Off. |
| 0222201 | 5/1987 | European Pat. Off. |
| 0287398 | 10/1988 | European Pat. Off. |
| 0310966 | 4/1989 | European Pat. Off. |
| 63-105062 | 5/1988 | Japan. |
| 1-193349 | 8/1989 | Japan. |

OTHER PUBLICATIONS

Odian, G., "Principles of Polymerization", 3rd Ed., 715–720 (1991) Wiley (New York).
Billmeyer, Jr., "Textbook of Polymer Science", 3rd Ed., 122 (1984) Wiley (New York).

*Primary Examiner*—Fred Zitomer
*Attorney, Agent, or Firm*—Bryan Cave

[57] ABSTRACT

Oil-repellent polymeric compositions prepared by a process which comprises:
a) adding at least a radical starter and at least a perfluoropolyether to at least a molten thermoplastic polymer;
b) intimately mixing the resulting composition for a time which is sufficient to obtain macroradicals from the polymer; and
c) cooling the final composition to room temperature.

8 Claims, No Drawings

OIL REPELLENT POLYMERIC COMPOSITION AND USE THEREOF, FOR PREPARING FORMED ARTICLES HAVING SURFACES ENDOWED WITH A HIGH STABILITY FORMED ARTICLES HAVING SURFACES ENDOWED WITH A HIGH STABILITY TO SOLVENTS AND A HIGH RESISTANCE TO SOILING

The present invention relates to oil-repellent polymeric compositions.

More in particular, the present invention relates to oil-repellent polymeric composition and to the use thereof in the preparation of formed articles having surfaces endowed with a high stability to solvents and a high resistance to soiling.

Still more in particular, the present invention relates to oil-repellent polymeric compositions prepared by means of a process capable of modifying thermoplastic polymers, in particular polyolefins and/or styrene resins, to be used, by means of usual conversion techniques, in the preparation of finished products or semi-finished products endowed with unusual surface properties of stability to solvents and resistance to soiling.

It is known to use thermoplastic polymeric compositions in continuously growing amounts in the sectors of furnishing and of household electrical apparatus of small and large dimensions.

One of the requirements, which these compositions have to meet is that of providing finished products endowed with an excellent and possibly durable surface appearance.

At present there are available on the market several polymers capable of meeting the first requirement, namely of providing articles having bright and glossy surfaces exhibiting lively and uniform color shades. As an example there can be cited polycarbonate, polymethylmethacrylate, ABS (acrylonitrile/butadiene/styrene terpolymer), polystyrene, SAN (styrene/acrylonitrile copolymer), etc. In the course of time, however, these materials tend to decay and, in particular, to lose their brightness or to exhibit halos, owing to the deteriorating action of the environment and to the action of cleaning agents such as solvents, detergents, abrasive detergents and the like.

The prior art suggests methods for improving the surface stability of the polymer to solvents or for increasing their resistance to soiling.

A method, which has been proposed to increase the oil-repellency characteristics of a polymer consists in coating the final article with fluorinated polymers, for example with polytetrafluoroethylene. This technique, however, beside exhibiting some problems as regards the adhesion of the coating to the substrate, has proved to be of little interest as the formed article, because of its being coated with the protective film, does not exhibit at all, or at least to a minimum extent, its original surface characteristics, such as brightness, color uniformity, etc.

An alternative has been illustrated in "Japan Plastic Age", January–February 1985, page 27, where there is described the use of oligomeric perfluoroacrylates as modifiers to be added to polymers in the molten state in order to impart oil-repellency characteristics to them.

However, also this technique has given little satisfactory results, since the fluorinated compounds in question, after the polymer conversion, migrate towards the surface of the formed article and impart to it only temporary oil-repellent characteristics, mainly after repeated cleaning operations.

The Applicant has now found that it is possible to produce modified compositions based on thermoplastic polymers which after conversion, for example by injection molding, blow molding, extrusion of plates for thermoforming, etc., permit to impart to the articles not only a permanent surface brightness, but chiefly a resistance to soiling and to dirtiness also after repeated cleaning operations with solvents and detergents, maintaining unaltered the mechanical and rheological properties of the starting polymer.

Thus, an object of the present invention are the oil-repellent polymeric compositions prepared by means of a process which comprises:
a) adding at least a perfluoropolyether and optionally at least a radical starter to at least a thermoplastic polymer in the molten state, capable of thermally or chemically forming macroradicals;
b) intimately mixing the resulting composition at high temperature for a time which is sufficient to form macroradicals from the polymer; and
c) cooling the final composition to room temperature.

More in particular, object of the present invention are the oil-repellent polymeric compositions prepared by means of a process which comprises:
a) adding to at least a thermoplastic polymer in the molten state and capable of thermally or chemically forming macroradicals 0.05–1% by weight, calculated on the polymer, of at least a perfluoropolyether and 0–1% by weight, calculated on the polymer, of at least a radical starter;
b) mixing the resulting composition at high temperature for a time ranging from 25 to 300 seconds; and
c) cooling the final composition to room temperature.

Particularly preferred, according to the present invention, are the polymeric compositions containing 0.1–0.6% by weight, referred to the polymer, of perfluoropolyether and 0.01–0.6% by weight, referred to the polymer, of a radical starter.

Any thermoplastic polymer capable of forming macroradicals either thermally and/or in the presence of starters is utilizable in the compositions of the present invention; illusrtative examples thereof comprise: polystyrene, impact-resistant polystyrene, polyolefins such as high, mean, low density polyethylene, polypropylene, impact-resistant polypropylene, polybutenes, etc., ethylene-vinylacetate copolymers, styrene-acrylonitrile copolymers (SAN), ethylene-propylene copolymers, etc., acrylonitrile-butadiene-styrene terpolymers (ABS), ethylene-propylene-diene terpolymers, etc.

Preferred polymers are polystyrene, impact-resistant polystyrene, polypropylene and impact-resistant polypropylene.

The perfluoropolyethers utilized in the present invention are polyoxyperfluoroalkylenes having a molecular weight higher than 500, generally ranging from 500 to 15,000 and, more preferably, from 1,500 to 10,000, characterized by repeating units of the type: $-CF_2O-$, $-C_2F_4O-$, $-C_3F_6O-$, etc., or isomers thereof, statistically distributed along the polymeric chain.

In particular, said perfluoropolyethers can have a structure of general formula:

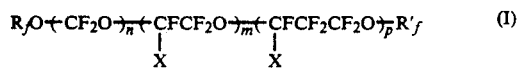 (I)

where X represents a fluorine atom or a —CF$_3$ radical, while R$_f$ and R'$_f$, like or different from each other, represent a C$_1$-C$_3$ perfluoroalkyl radical, optionally linked to functionalized groups of the type: —COOH, —CH$_2$OH, —CONH$_2$, etc.; n, m, p are numbers higher than or equal to zero such that m+n+p is equal to at least 2, or such as to provide the above-mentioned molecular weights.

These polyethers can be obtained, for example, by photooxidation of C$_2$-C$_4$ perfluoroolefins, as is described in U.S. Pat. No. 3,699,145, or by oligomerization of epoxides of perfluorinated C$_2$-C$_3$ olefins or of fluorinated oxyethanes, as is described in published European patent application No. 148,482. Commercially available perfluoropolyethers are, for example, the ones which are known under the trade-names Fomblin produced by Montefluos, Milan, or Krytox produced by Du Pont.

The radical starters are selected from the peroxides having a decomposition temperature from 120° to 200° C., preferably from 140° to 160° C., and from the starter of the C—C type having a decomposition temperature from 250° to 350° C., preferably from 260° to 300° C. Examples of starters of the peroxide type are: dicumyl peroxide, tert.butylperbenzoate, ethyl-3,3-bis(tert.butylperoxy)-butyrate, 1,1-bis(tert.butylperoxy)-3,5,5-trimethylcyclohexane, etc.

Examples of starters of the C—C type are the ones described in U.S. Pat. No. 4,948,820.

A process for preparing the polymeric compositions of the invention comprises mixing the above-mentioned components at a temperature above the polymer softening temperature and in general at a temperature higher than 150° C., preferably at a temperature ranging from 180° to 350° C., for times ranging from 25 to 300 seconds, and then cooling the resulting composition to room temperature.

Since the best results have been obtained by mixing the components under shearing stress, it is preferable to carry out the mixing in an extruder, at the outlet of which the compositions are cooled and granulated by means of conventional techniques.

The polymeric compositions of the present invention can be added with auxiliary materials known in the art, such as stabilizers, antistatic agents, antioxidants, pigments, dyes, reinforcing agents, for example mineral fillers or glass fibres, etc., and they can be transformed into formed articles or bodies by means of conventional techniques for transforming polymers, such as injection molding, compression molding, blow molding, co-injection, extrusion, thermoforming, roto-molding, etc.

For a better understanding of the present invention and for reducing the same to practice, a few illustrative but not limitative examples are given hereinafter.

In order to evaluate the characteristics of the articles with the polymeric compositions modified in accordance with the invention, test-pieces are prepared by injection molding, said test-pieces having the form of plates of the following dimensions: 400×400 mm and a thickness of 3 mm.

The test-pieces, after conditioning in air, are subjected to solvent stability and soiling resistance tests, which consist in rubbing, by means of a cloth imbued with ethyl alcohol, gasoline (isooctane) and sodium hypochlorite, respectively, the surfaces before and after soiling with graphite in powder.

On conclusion of the tests, the conditions of the surfaces are checked as regards the presence of stains or halos, and scalar values are assigned starting from 1, for perfectly clean and bright surfaces, to 5, for surfaces characterized by the presence of showy halos or stains.

EXAMPLE 1 (COMPARATIVE)

A) 100 parts by weight of a granular basic resin consisting of a mixture of polystyrene and low density polyethylene (trade-name Koblend P 475 E, produced by Montedipe, Milan) were uniformly mixed, in a common drum-tilting mixer at room temperature, with 0.2 parts by weight of Fomblin 1800 YR (perfluoropolyether sold by Montefluos, Milan). The mixture was fed to a Dolci single-screw extruder, then it was extruded by operating at a temperature of 210° C. at the extruder head, whereafter it was granulated.

Test-pieces in the form of plates were obtained from the granules by means of injection molding at a temperature of about 230° C. Solvent stability and soiling resistance characterization was carried out on the test-pieces; the results are reported in Table 1.

B) It was operated as in example 1A, without adding Fomblin 1800 YR. The results of stability to solvents and resistance to soiling are reported in Table 1.

EXAMPLE 2

To the polymeric mixture of example 1A there were added 0.3 parts by weight of dicumyl peroxide.

The final composition was mixed in an extruder for 180 seconds in order to restructure the polymer.

At the end, the composition was granulated and extruded at a temperature of 210° C. at the extruder head. Plates were prepared from the granules in order to characterize the surfaces after the cleaning tests.

Table 1 indicates that the surfaces did exhibit neither appreciable aesthetic variations nor halos even after soiling with graphite.

EXAMPLE 3 (COMPARATIVE)

A) 100 parts by weight of polystyrene (Edistir SRL 800 produced by Montedipe, Milan) were uniformly mixed with 0.15 parts by weight of Fomblin 1800 YR according to the modalities of example 1A. The mixture was fed to a Dolci single-screw extruder and then extruded by operating at a temperature of 200° C. at the extruder head, then it was granulated. Test-pieces in the form of plates were obtained from the granules by means of injection molding at a temperature of about 220° C.

The results of stability to solvents and resistance to soiling are reported in Table 1.

B) Test 3A was repeated without adding Fomblin 1800 YR to the polymer. The results of stability to solvents and resistance to soiling are reported in Table 1.

EXAMPLE 4

0.3 parts by weight of dicumyl peroxide were added to the polymeric mixture of example 3A. The final composition was mixed in an extruder for 180 seconds in order to restructure the polymer.

At the end, the composition was granulated and extruded at a temperature of 200° C. at the extruder head. Test-pieces were prepared from the granules following the methodology of example 3A. The final results are reported in Table 1.

EXAMPLE 5 (COMPARATIVE)

A) 100 parts by weight of polypropylene (Moplen EPD 60 R, produced by Himont Italia, Milan) were uniformly mixed with 0.25 parts of Fomblin 1800 YR according to the modalities of example 1A.

The mixture was extruded in a Dolci single-screw extruder at an extruder head temperature of 190° C. and then was granulated. Test-pieces in the form of plates were prepared grom the granules by means of injection molding carried out at a temperature of about 230° C.

The results of stability to solvent and resistance to soiling are reported in Table 1.

B) Test 5A was repeated without adding Fomblin 1800 YR to the polymer. The values of stability to solvents and resistance to soiling are reported in Table 1.

EXAMPLE 6

To the polymeric mixture of example 5A there were added 0.2 parts by weight of 2,3-dimethyl-2,3-diphenylbutane, a C—C radical starter, sold by Peroxyd-Chemie under the trade-name Interox CCDFB. The final composition was mixed in an extruder for 180 seconds in order to restructure the polymer.

At the end, the composition was granulated and extruded at an extruder head temperature of 280° C.

According to the methodology of example 5A, test-pieces were prepared from the granules. The final results are reported in Table 1.

EXAMPLE 7

100 parts by weight of polypropylene (Moplen EPD 60R produced by Himont Italia, Milan) were mixed with 0.25 parts of Fomblin 1800 YR and with 0.3 parts of silylpinacolone ether, a C—C starter sold by Bayer under the designation ZF-WFH-5090. The final composition was mixed in an extruder for 180 seconds in order to restructure the polymer.

At the end, the composition was extruded in granules at an extruder head temperature of 280° C.

According to the modalities of example 5A, test-pieces were prepared from the granules. The final results are reported in Table 1.

TABLE 1

| Test Examples | Stability to solvents | | | Resistance to soiling | | |
|---|---|---|---|---|---|---|
| | Ethanol | Isooctane | Hypochlorite | Ethanol | Isooctane | Hypechlorite |
| 1A | 4 | 4 | 3 | 5 | 5 | 5 |
| 1B | 4 | 4 | 4 | 5 | 5 | 5 |
| 2 | 1 | 2 | 1 | 1 | 2 | 1 |
| 3A | 5 | 4 | 3 | 5 | 4 | 4 |
| 3B | 4 | 4 | 4 | 5 | 5 | 5 |
| 4 | 1 | 1 | 1 | 2 | 2 | 2 |
| 5A | 3 | 5 | 3 | 5 | 4 | 4 |
| 5B | 4 | 4 | 4 | 5 | 5 | 5 |
| 6 | 2 | 1 | 2 | 2 | 1 | 2 |
| 7 | 1 | 1 | 2 | 1 | 1 | 2 |

We claim:
1. Oil-repellent polymeric compositions prepared by a process comprising the following steps:
  (a) adding a perfluoropolyether having a molecular weight greater than 500 and a radical initiator to a thermoplastic molten polymer selected from the group consisting of polystyrene, impact-resistant polystyrene, polyolefins, ethylene-vinylacetate copolymers, styrene-acrylonitrile copolymers, ethylene-propylene copolymers, acrylonitrile-butadiene-styrene terpolymers, and ethylene-propylene-diene terpolymers,
  (b) mixing said perfluoropolyether, radical initiator, and thermoplastic molten polymer for a time which is sufficient to form macroradicals from said thermoplastic molten polymer, and
  (c) subsequently cooling the mixture of step (b) to room temperature.
2. The oil-repellent polymeric compositions of claim 1, wherein the perfluoropolyether is added in an amount of 0.05–1% by weight of the thermoplastic molten polymer, the radical initiator is added in an amount of 0.01–1% by weight of the thermoplastic molten polymer, and wherein the time for mixing the perfluoropolyether, the radical initiator and the thermoplastic molten polymer ranges from 25 to 300 seconds.
3. The oil-repellent polymeric compositions of claim 1, wherein the perfluoropolyether is added in an amount of 0.1–0.3% by weight of the thermoplastic molten polymer, and the radical initiator is added in an amount of 0.01–0.6% by weight of the thermoplastic molten polymer.
4. The oil-repellent polymeric compositions of claim 1, wherein said thermoplastic molten polymer is selected from the group consisting of polystyrene, impact-resistant polystyrene, polypropylene, and impact-resistant polypropylene.
5. The oil-repellent polymeric compositions of claim 1, wherein the perfluoropolyether is a polyoxyperfluoroalkylene having a molecular weight ranging from 500 to 15,000.
6. The oil-repellent polymeric compositions of claim 1, wherein the radical initiator is a peroxide having a decomposition temperature of from 120° to 200° C.
7. The oil-repellent polymeric compositions of claim 6, wherein the peroxide has a decomposition temperature of from 140° to 160° C.
8. The oil-repellent polymeric compositions of claim 1, wherein the radical initiator is selected from the group consisting of 2,3-dimethyl-2,3-diphenylbutane and silylpinacolone ether.

* * * * *

UNITED STATES PATENT AND TRADEMARK OFFICE
CERTIFICATE OF CORRECTION

PATENT NO. : 5,300,587

DATED : Apr. 5, 1994

INVENTOR(S): Francesco Mascia, et al

It is certified that error appears in the above-identified patent and that said Letters Patent is hereby corrected as shown below:

On title page, item [54] and col. 1, line 5, after "HIGH STABILITY"
    delete --FORMED ARTICLES HAVING SURFACES ENDOWED WITH HIGH STABILITY--.

Signed and Sealed this

Eighth Day of November, 1994

Attest:

BRUCE LEHMAN

Attesting Officer  Commissioner of Patents and Trademarks